United States Patent
Shabany et al.

(10) Patent No.: US 8,060,811 B2
(45) Date of Patent: Nov. 15, 2011

(54) LOW COMPLEXITY OPTIMAL SOFT MIMO RECEIVER

(75) Inventors: Mahdi Shabany, Toronto (CA); Roya Doostnejad, Toronto (CA)

(73) Assignee: Redline Communications, Inc., Markham, ON (CA)

( * ) Notice: Subject to any disclaimer, the term of this patent is extended or adjusted under 35 U.S.C. 154(b) by 808 days.

(21) Appl. No.: 12/046,747

(22) Filed: Mar. 12, 2008

(65) Prior Publication Data

US 2009/0232241 A1    Sep. 17, 2009

(51) Int. Cl.
*H03M 13/03* (2006.01)
(52) U.S. Cl. .................. 714/794; 375/341; 375/347
(58) Field of Classification Search .................. 714/794; 375/341, 347
See application file for complete search history.

(56) References Cited

U.S. PATENT DOCUMENTS

| | | | |
|---|---|---|---|
| 2005/0147025 A1* | 7/2005 | Auer | 370/203 |
| 2007/0077969 A1* | 4/2007 | Lauer et al. | 455/562.1 |
| 2008/0108310 A1* | 5/2008 | Tong et al. | 455/69 |
| 2008/0181342 A1* | 7/2008 | Cho et al. | 375/347 |

OTHER PUBLICATIONS

Siti M; Fitz M, "Layered Orthogonal Lattice Detector for Two Transmit Antenna Communications", Sep. 28, 2005. * the whole document *.
Alessandro Tomason et al: "Turbo-Lord: A MAP-Approaching Soft-Input Soft-Output Detector for Iterative MIMO Receivers", Nov. 1, 2007 *p. 3504, col. 2, paragraph 2*.
European Search Report, dated Aug. 9, 2010; relating to the corresponding European Application No. 09003541.1-2415/2101454.

* cited by examiner

*Primary Examiner* — M. Mujtaba K Chaudry
(74) *Attorney, Agent, or Firm* — Nixon Peabody LLP

(57) ABSTRACT

A low-complexity optimal soft MIMO detector is provided for a general spatial multiplexing (SM) systems with two transmit and $N_R$ receive antennas. The computational complexity of the proposed scheme is independent from the operating signal-to-noise ratio (SNR) and grows linearly with the constellation order. It provides the optimal maximum likelihood (ML) solution through the introduction of an efficient Log-likelihood ratio (LLR) calculation method, avoiding the exhaustive search over all possible nodes. The intrinsic parallelism makes it an appropriate option for implementation on DSPs, FPGAs, or ASICs. In specific, this MIMO detection architecture is very suitable to be applied in WiMax receivers based on IEEE 802.16e/m in both downlink (subscriber station) and uplink (base station).

20 Claims, 7 Drawing Sheets

First Child algorithm based on QR-Decomposition

Simplified First Child scheme

LOW COMPLEXITY OPTIMAL SOFT MIMO RECEIVER

TECHNICAL FIELD

The present disclosure pertains generally to the multiple-input multiple-output (MIMO) communication systems, and more particularly to the techniques for optimal soft detection MIMO Receivers.

BACKGROUND

Multiple-input-multiple-output (MIMO) systems have received significant attention as a promising method for achieving large spectral efficiency, which makes it the technology of choice in many standards such as IEEE802.11n, IEEE802.16e/m, and IEEE 802.20. One of the main challenges in exploiting the potential of MIMO systems is to design low-complexity, high-throughput detection schemes, which are suitable for efficient VLSI realization, to implement low-power MIMO receivers with near-maximum-likelihood (ML) performance.

In spatial multiplexing (SM) multiple-input multiple-output (MIMO) schemes with $N_T$ transmit and $N_R$ receive antennas ($N_T \times N_R$ system), where $N_R \geq N_T$, $N_T$ data streams are transmitted simultaneously from $N_T$ antennas. This results in an increase in the system's spectral efficiency by a factor of $N_T$ assuming that the data streams can be successfully decoded. The mathematical model for a SM MIMO system is:

$$y = Hs + n \quad (1)$$

where y is a $N_R \times 1$ received vector, with $N_R$ equal to the number of receive antennas, H is the $N_R \times N_T$ channel matrix, s is the transmit vector, and n is a $N_R \times 1$ received noise vector. The average signal-to-noise ratio (SNR) of all $N_T$ streams has to be maintained without increasing the total transmit power compared to single-antenna systems. In fact in order to achieve the maximum spectral efficiency, the interference resulted from simultaneous transmission of $N_T$ data streams has to be suppressed at the receiver using a MIMO detection scheme. The optimum detector, achieving the full diversity order of $N_R$, is the maximum-likelihood (ML) detector, which finds the transmitted symbol vector via solving the following optimization problem.

$$\hat{s} = \mathrm{argmin}_s \|y - Hs\|^2. \quad (2)$$

where $\hat{s}$ represents the optimal detected symbol at the receiver.

This optimization problem is computationally expensive to implement specially for high-order constellation schemes and/or MIMO systems with large number of transmit antennas. This is because of the fact that it requires an exhaustive search over all $Q^{N_T}$ possible input vectors, where Q is the modulation level. For instance in a MIMO system with only two transmit antennas using the 64-QAM modulation scheme, there are total of $64^2 = 4096$ symbol vectors to search through. The main downside of the ML detector is the fact that its complexity grows exponentially with the modulation level. Thus the goal is to design an optimal detector with the exact ML performance, while having a linear complexity with respect to the modulation level and independent of the SNR and channel status.

On the other hand, the complexity of the exhaustive-search optimal ML detection scheme grows exponentially with the number of transmit antennas. Therefore, lower-complexity suboptimal receivers are required to be developed in practical applications. The existing approaches used to alleviate the high computational complexity of the ML detector fall into the following two main categories:

Linear receivers: Zero-forcing and Minimum Mean Square Error (MMSE) receivers are the most common low-complexity candidates, which are able to remove the spatial interference between the transmitted data streams with a linear complexity. However, the achieved diversity order with a linear receiver is $N_R - N_T + 1$. This means in a 2×2 MIMO system, there is no diversity gain, which results in a significant performance loss compared to the ML receiver.

Suboptimal ML receivers: which are lower-complexity approximations of the ML detector with a close-to-ML performance. The lower complexity is as a result of choosing a limited search space compared to the ML exhaustive search. As a consequence, the optimal ML solution may not be included in the search space, which generates the performance loss. However, in general these methods outperforms the linear receivers. Depending on the non-exhaustive search methodology, the suboptimal algorithms fall into two main categories, namely the depth-first methods, and breadth-first methods.

Sphere decoding (SD) is the most attractive depth-first approach whose performance is the same as ML under the assumption of unlimited execution time. However, the actual runtime of the algorithm depends not only on the channel realization/status, but also on the operating SNR. Thus leading to a variable throughput rate resulting in an extra overhead in the VLSI implementation due to the extra required I/O buffers and lower hardware utilization.

Among the breadth-first search methods, the most well-known approach is the K-Best algorithm. The K-Best algorithm guarantees a SNR-independent fixed-throughput detector with a performance close to the ML. Being fixed-throughput in nature along with the fact that the breadth-first approaches are feed-forward detection schemes with no feedback, makes them especially attractive for the hardware implementation. There has been some efforts on the implementation of the K-Best algorithm, however, the K-Best algorithm consists of node expansion and sorting cores, which are both time-hungry and the bottleneck in the hardware resulting in low-throughput architectures. Moreover, their performance also deteriorates for high-SNR regimes.

Therefore, there is a crucial need for a detector, which has the optimal performance of the ML detector, the high-speed feature of the depth-first approaches, and the SNR-independent fixed-throughput architecture of the breadth-first schemes.

SUMMARY

The disclosure provides a low-complexity optimal soft MIMO detector for a general spatial multiplexing (SM) systems with two transmit and $N_R$ receive antennas. The computational complexity of the proposed scheme is independent from the operating signal-to-noise ratio (SNR) and grows linearly with the constellation order. It provides the optimal maximum likelihood (ML) solution through the introduction of an efficient Log-likelihood ratio (LLR) calculation method, avoiding the exhaustive search over all possible nodes. The intrinsic parallelism makes it an appropriate option for implementation on DSPs, FPGAs, or ASICs. In specific, this MIMO detection architecture is very suitable to be applied in WiMax receivers based on IEEE 802.16e/m in both downlink (subscriber station) and uplink (base station).

Thus, the present disclosure provides a method of performing a linear-complexity optimal soft Multiple-input-multiple-output (MIMO) detector in a $2 \times N_R$ system, the method comprising the steps of: calculating the first and second generator matrices using channel pre-processing based upon a channel matrix; applying the generator matrices to a received vector to generate a first and a second modified received vectors wherein the first modified received vector comprises an original transmitted vector and the second modified received vector comprises a flipped version of the original transmitted vector; selecting a first element and a second element of the transmitted vector as child and parent symbols respectively; determining, for both the transmitted vector and the flipped version of the transmitted vector, for each possible value of the parent symbol, a first child by mapping a zero-forcing estimate of the child symbol to the nearest constellation point in an associated constellation scheme using the first and second modified received vectors; adding candidates to a candidate list from the determined parent symbol and it's first child symbol for each of the transmitted vector and flipped version of transmitted vector; and calculating log-likelihood ratios (LLRs) of all bits for each resulting vector.

Also provided is a method of performing a linear-complexity optimal soft Multiple-input-multiple-output (MIMO) detection for a $2 \times N_R$ system, the method comprising the steps of: calculating a first generator matrix using channel pre-processing based upon a channel matrix; applying the first generator matrix to a received vector to generate a first modified received vector; selecting, for a transmitted vector, a first element as a child symbol and a second element as a parent symbol; determining, for the transmitted vector, for each possible value of the parent symbol, a first child by mapping a zero-forcing estimate of the child symbol to a nearest constellation point in an associated constellation scheme using the first modified received vector and the channel matrix; adding, for the transmitted vector, candidates to a candidate list of transmitted vectors from the determined parent symbol and its child symbol; calculating log-likelihood ratios (LLRs) of all bits for the parent symbol of the transmitted vector; calculating a second generator matrix using the channel pre-processing based upon the swapped version of the channel matrix; wherein the swapped version of the channel matrix derived by swapping the columns of the channel matrix; applying the second generator matrix to the received vector to generate the second modified received vector; selecting, for the flipped transmitted vector, a first element as a child symbol and the second element as a parent symbol; the flipped transmitted vector is derived by flipping the rows of the transmitted vector; determining, for the flipped transmitted vector, for each possible value of the parent symbol, a first child by mapping a zero-forcing estimate of the child symbol to a nearest constellation point in an associated constellation scheme using the second modified received vector and the channel matrix; adding, for the flipped transmitted vector, candidates to the candidate list of the flipped transmitted vectors from the determined parent symbol and its first child symbol; and calculating log-likelihood ratios (LLRs) of all bits for the parent symbol of the flipped transmit vector.

BRIEF DESCRIPTION OF THE DRAWINGS

Further features and advantages of the present disclosure will become apparent from the following detailed description, taken in combination with the appended drawings, in which.

DETAILED DESCRIPTION

Embodiments are described below, by way of example only, with reference to FIGS. 1-7. A novel scalable pipelined architecture for MIMO soft symbol detection featuring an efficient implementation for a $2 \times N_R$ MIMO system is provided. The transmission scheme is based on the spatial multiplexing scheme. The method provides a channel independent scheme with fixed-throughput independent of the SNR value. The architecture operates at a significantly lower complexity than currently reported schemes as its complexity grows linearly with the constellation order, which makes it applicable for a broad range of applications/standards with various constraints on the constellation size. A means of non-exhaustive search is provided, which is applied twice, once per antenna, and both in parallel. It efficiently searches over a subset of nodes, which provides all the LLR values of transmitted bits resulting in the optimal soft detection at the receiver.

The architecture is also customized for the specific application of uplink collaborative MIMO in IEEE 802.16e standard. Since the node expansion and LLR calculation cores cooperate on a data-driven basis, and the scheme is applied independently for each antenna, the architecture is well-suited for a pipelined parallel VLSI implementation with a fixed critical path length independent of the constellation order.

The detection technique described herein may be used for various wireless MIMO communication systems including the MIMO-OFDM systems. For clarity, the various embodiments are described for the MIMO detection core of a $2 \times N_R$ MIMO system.

Figure 1:
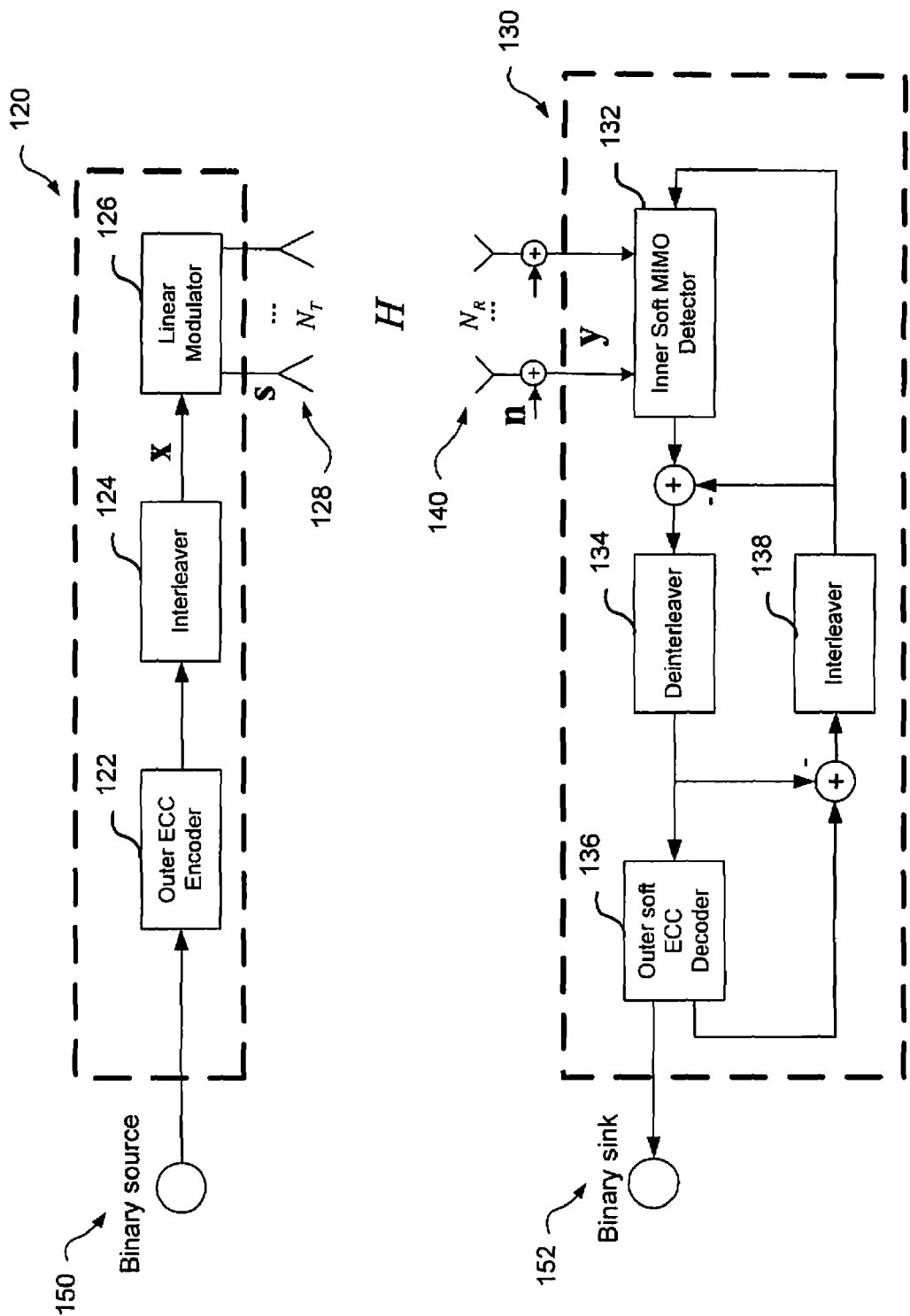
FIG. 1 is a block diagram of the MIMO transmitter and iterative receiver structure.

System Model: In a wireless MIMO system as shown in FIG. 1, with $N_T$ transmit 128 and $N_R$ receive antennas 140, the equivalent fading channel can be described by a complex-valued $N_R \times N_T$ matrix H. A typical bit interleaved coded modulation (BICM) MIMO system is considered with an iterative APP receiver 130. The transmitter 120, receives a binary source 150 where a block of information bits is encoded with convolutional turbo code 122 and permuted by an interleaver 124. At a specific time instant, the encoded bits of the sequence $x=[x_1, \ldots, x_{M_c N_t}]^T$ as a part of the permuted stream are mapped into a complex vector $s=[s_1, \ldots, s_{N_t}]^T$ by $N_T$ linear modulators in which each element is independently drawn from a complex constellation $\Omega$ (symmetric $|\Omega|$-QAM schemes with $M_c = \log_2 |\Omega|$ bits per symbol, i.e., $|\Omega| = 2^{M_c}$). For instance in the case of 4-QAM, $|\Omega|=4$, $\Omega=\{-1-j, -1+j, 1-j, 1+j\}$, and $M_c=2$, meaning there are two bits per transmitted symbol. This implies that $x_1, x_2$ are mapped to $s_1$ and so on. The QAM modulated signals are passed through the linear modulator 126, which essentially determines the way that the QAM modulated signals are transmitted on $N_T$ antennas 128 at the transmitter side. The complex baseband equivalent model can be expressed as $$y = Hs + n \quad (3)$$

where $y = [y_1, y_2, \ldots, y_{N_R}]^T$ is the $N_R$-dimensional received symbol vector, and $n = [n_1, n_2, \ldots, n_{N_R}]^T$ represents the $N_R$-dimensional independent identically distributed (i.i.d.) circularly symmetric complex zero-mean Gaussian noise vector with variance $\sigma^2$, i.e., $n_i \epsilon N_c(0, \sigma^2)$.

Hard detection: The aim of the MIMO hard detection method is to estimate the transmitted vector $\hat{s}$ based on the observation y, i.e., $$\hat{s} = argmin_s \|y - Hs\|^2. \quad (4)$$

In other words, in a two-dimensional constellation scheme, the one with the lowest Euclidean distance from the received point is announced to be the transmitted symbol. In a $N_R \times N_T$ MIMO system, there are $|\Omega|^{N_T}$ possible transmit vectors to search through. For example in a $2 \times N_R$ MIMO system with 64-QAM constellation scheme there are $64^2 = 4096$ possible vector symbols to explore. Therefore, even for a 2×2 system with high-order constellation schemes, the required computation to find the optimal point is expensive from the implementation point of view, whose amount of computation may exceed the processing power of the current state-of-the-art DSP or FPGAs at the receiver.

Soft detection: Since the transmitted bits x, are the output of an ECC encoder 122 that introduces redundancy, the bit-by-bit decision is no longer optimal. The a posteriori probability (APP) MIMO detector 132 should make decision jointly on all blocks using the knowledge of the correlation across blocks, and the channel decoding is performed using soft information on all the blocks obtained from the APP MIMO detector. Therefore, an iterative receiver that performs joint detection and decoding is required.

An iterative receiver 130 consists of two stages: the soft MIMO APP detector 132, followed by an outer soft ECC decoder 136 providing binary output 152. The two stages are separated by a deinterleaver 134 and an interleaver 138. FIG. 1 illustrates how the soft information is iterated between the MIMO APP detector 132 and the outer soft ECC decoder 136. The outer soft ECC decoder 136 and deinterleaver 134 and interleaver 138 can be identified as a Convolutional Turbo Code (CTC) decoder. Considering each transmit antenna 128 as a layer, the optimal log-likelihood ratio (LLR) of the bit $x_k$, $k = 1, \ldots, M_c$, of the l-th layer knowing the received vector y, is obtained by the APP detector as follows.

$$L(x_{k,l} | y) = \log \frac{P(x_{k,l} = +1 | y)}{P(x_{k,l} = -1 | y)}, \quad (5)$$

where −1 and +1 are used for representing bit "0", and "1", respectively. For the known channel H in an additive white Gaussian noise (AWGN) environment, using the Bayes' theorem, the above LLR, $L(x_{k,l}|y)$, can be written as:

$$\log \frac{P(y | x_{k,l} = +1) P(x_{k,l} = +1)}{P(y | x_{k,l} = -1) P(x_{k,l} = -1)} \quad (6)$$

$$= \log \frac{\sum_{\chi_{k,l}^{+1}} \exp\left(\frac{-\|y - Hs\|^2}{2\sigma^2}\right)}{\sum_{\chi_{k,l}^{-1}} \exp\left(\frac{-\|y - Hs\|^2}{2\sigma^2}\right)} + \log \frac{P(x_{k,l} = +1)}{P(x_{k,l} = -1)} \quad (7)$$

where $\chi_{k,l}^{+1} = \{s : x_{k,l} = +1\}$ and $\chi_{k,l}^{-1} = \{s : x_{k,l} = -1\}$ represent all the possible vectors that have +1 and −1 in their k-th bit of the l-th layer, respectively. Moreover, the extra term in (7) can be ignored as two cases of being +1 and −1 are equally likely. This formula is computationally complex and needs to be simplified for the practical implementation. Employing the max-log approximation, the LLR values (i.e., $L(x_{k,l}|y)$) can be approximated by the maximum term on the numerator and denominator as follows.

$$\cong \log \frac{\max_{\chi_{k,l}^{+1}} \exp\left(\frac{-\|y - Hs\|^2}{2\sigma^2}\right)}{\max_{\chi_{k,l}^{-1}} \exp\left(\frac{-\|y - Hs\|^2}{2\sigma^2}\right)} \quad (8)$$

$$= \frac{1}{2\sigma^2}\left[\min_{\chi_{k,l}^{-1}} \|y - Hs\|^2 - \min_{\chi_{k,l}^{+1}} \|y - Hs\|^2\right]$$

The optimal detector in an iterative MIMO receiver is well-known to be the MAP detector, sometimes also called a posteriori probability (APP) detector. This detector computes extrinsic information on the channel bits, written in terms of the log-likelihood ratios (LLRs). LLR values can be calculated in many different methods, which depends on the complexity/performance feature of that method. The optimal solution for the implementation of the soft ML decoder requires exploring all the possible symbol vectors and calculates the LLR value of each individual bit accordingly. Even by employing the simplification in (8), this incurs the computational complexity of $|\Omega|^{N_T}$ visited points, which is prohibitive for most of the applications. Soft sphere decoder is one alternative, whose idea is to reduce the number of visited symbol vectors to be considered in the search that solves the optimization problem in (4), without accidentally excluding the ML solution. This goal is achieved by constraining the search to only those points of Hs that lie inside a hyper-sphere with radius r around the received point y. Since the soft detection is of concern, lists of candidates are required at the end to calculate the LLR values. Thus in the list sphere decoder as opposed to the hard-SD, the radius of the sphere is not decreased as the depth of the tree is expanded. This would result in a list of visited points rather than just the ML point, i.e., so the name list sphere decoder (LSD). Note that the LSD would produce a list of points, including the hard ML point, which is the result of the hard SD. Although list SD provides a subset of visited nodes much less than that of the ML detector, its performance is not guaranteed to be ML, thus the list has to be large enough to assure the optimality. Moreover, list sphere decoder only reduces the average complexity compared to the ML detector although it has been shown that its computational complexity is exponential in the number of transmit antennas. The fact that its computational complexity is channel dependent makes it less attractive for practical implementations.

MIMO Detection: The channel, H is assumed to be known at the receiver 130 (e.g., through channel estimation in a preceding training phase). There are linear/non-linear receiver algorithms to separate and detect the simultaneously transmitted data streams such as MMSE, Maximum-likelihood detector, sphere decoder, fixed-sphere decoder, iterative tree search, and distributed ML. Each of these approaches has its own drawbacks including the hardware complexity, channel/SNR dependency, and the non-optimal performance. The described architecture in FIG. 2 alleviates both of the above problems.

Detection method: Presented in a general case, two transmitted symbols are assumed to have different modulation levels. This makes the algorithm applicable to both downlink (subscriber station) and uplink collaborative MIMO (in IEEE 802.16e standard) where two single-antenna users transmitting at the same time slot and carrier are modeled as a 2×2 MIMO system. Obviously, two users can have different constellations independent of one another.

Figure 2:
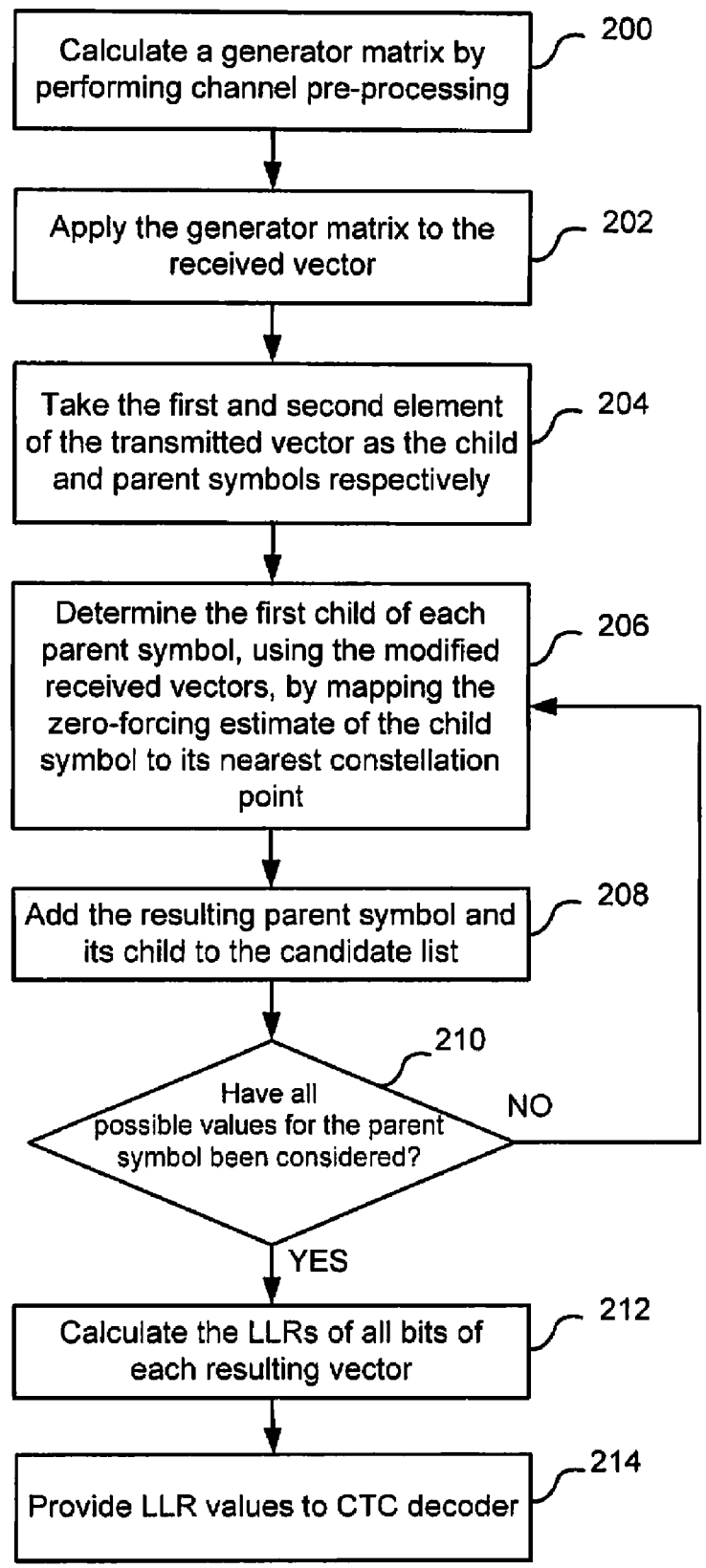
FIG. 2 shows a method of a linear-complexity optimal soft MIMO detector.

FIG. 2. shows the method of the optimal soft MIMO detector with the linear complexity where $$y = \begin{bmatrix} y_1 \\ y_2 \end{bmatrix}$$

is considered as the received vector, and $$\begin{bmatrix} s_1 \\ s_2 \end{bmatrix}$$

and its flipped version, $$\begin{bmatrix} s_2 \\ s_1 \end{bmatrix},$$

are considered as the first and second transmitted vectors. The flipped version of the transmitted vector convey no extra information and is introduced to ease the description of the process. For $$\begin{bmatrix} s_1 \\ s_2 \end{bmatrix}, H = \begin{bmatrix} h_{11} & h_{12} \\ h_{21} & h_{22} \end{bmatrix}$$

is considered as its corresponding channel matrix whereas for $$\begin{bmatrix} s_2 \\ s_1 \end{bmatrix},$$

the channel matrix is $$\tilde{H} = \begin{bmatrix} h_{12} & h_{11} \\ h_{22} & h_{21} \end{bmatrix}.$$

The algorithm, i.e., steps 200 through 214, are implemented twice, once for the pair $$\left( \begin{bmatrix} s_1 \\ s_2 \end{bmatrix}, H = \begin{bmatrix} h_{11} & h_{12} \\ h_{21} & h_{22} \end{bmatrix} \right)$$

and once for the pair $$\left( \begin{bmatrix} s_2 \\ s_1 \end{bmatrix}, \tilde{H} = \begin{bmatrix} h_{12} & h_{11} \\ h_{22} & h_{21} \end{bmatrix} \right).$$

For each pair, the channel pre-processing is performed to calculate the generator matrix at step 200, which is either the QR-decomposition or D-matrix generation block. The output of the pre-processing block is a matrix, called the generator matrix, that is applied to the received signal vector (equations (9), (13), or (18), and (20)). The generator matrix is $Q^H$ in the QR-decomposition method or matrix D in the simplified First-Child scheme. The generated matrix is applied to the received vector at step 202. The first element of each transmitted vector is taken as the child symbol while its second element is taken as the parent symbol at step 204. For each transmitted vector, all possible values for the parent symbol is considered and at step 206 for each considered parent symbol, its best (first) child is determined using the zero-forcing estimate based on the modified received vector. The resulting parent symbol and its first child are added to the candidate list at step 208. If all of the possible values for the parent symbol have not been considered, No at step 210, the process repeats at step 206 until all the candidates from the respective constellation scheme for the parent symbol are considered. When all possible values for the parent symbol have been considered, Yes at step 210, the log-likelihood ratios (LLRs) of all bits are calculated for each resulting vector at step 212. The resulting LLR values are provided to the CTC decoder at step 214.

Figure 3:
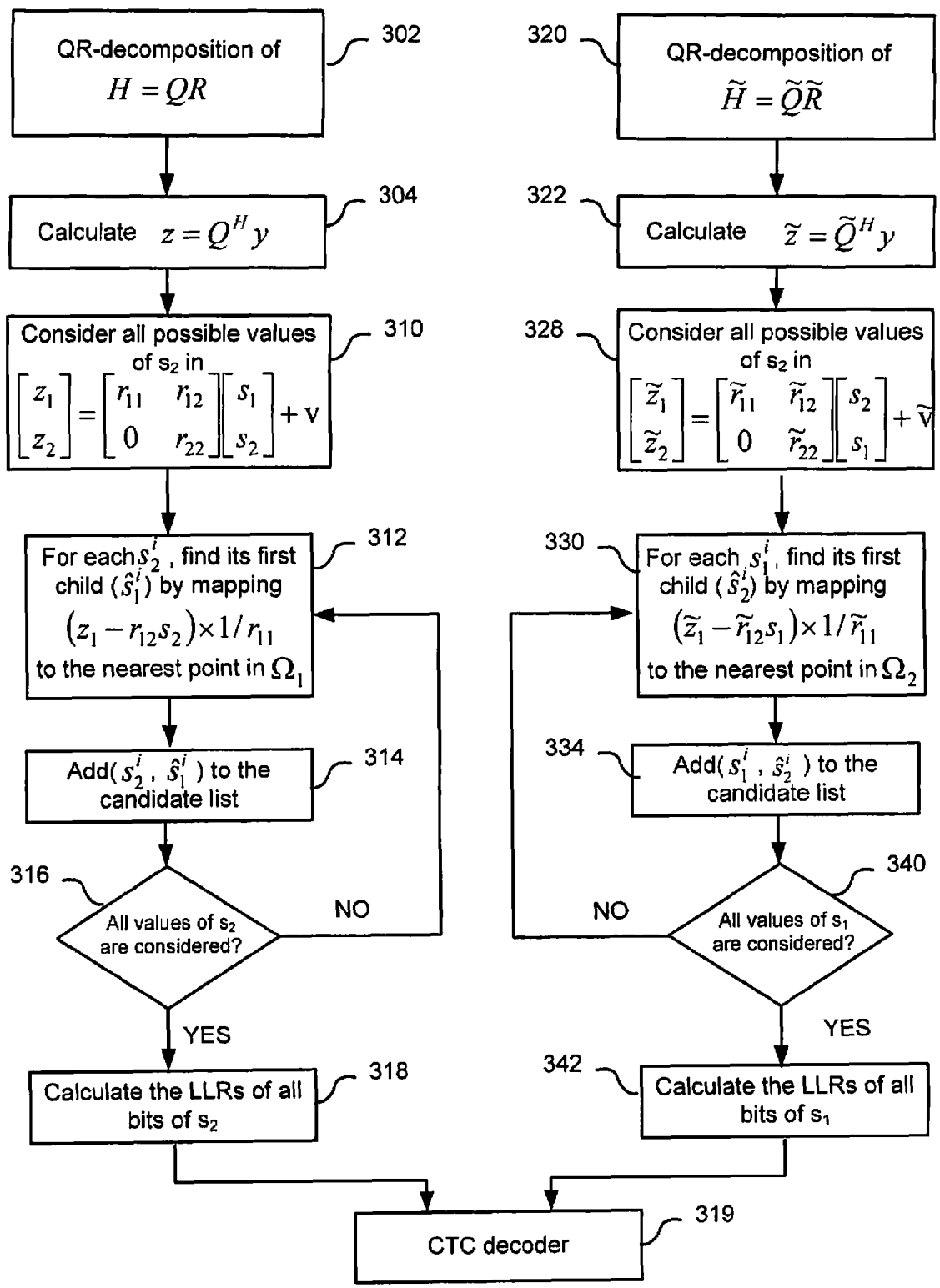
FIG. 3 shows a method of a linear-complexity optimal soft MIMO detector using a QR-decomposition.
Figure 4:
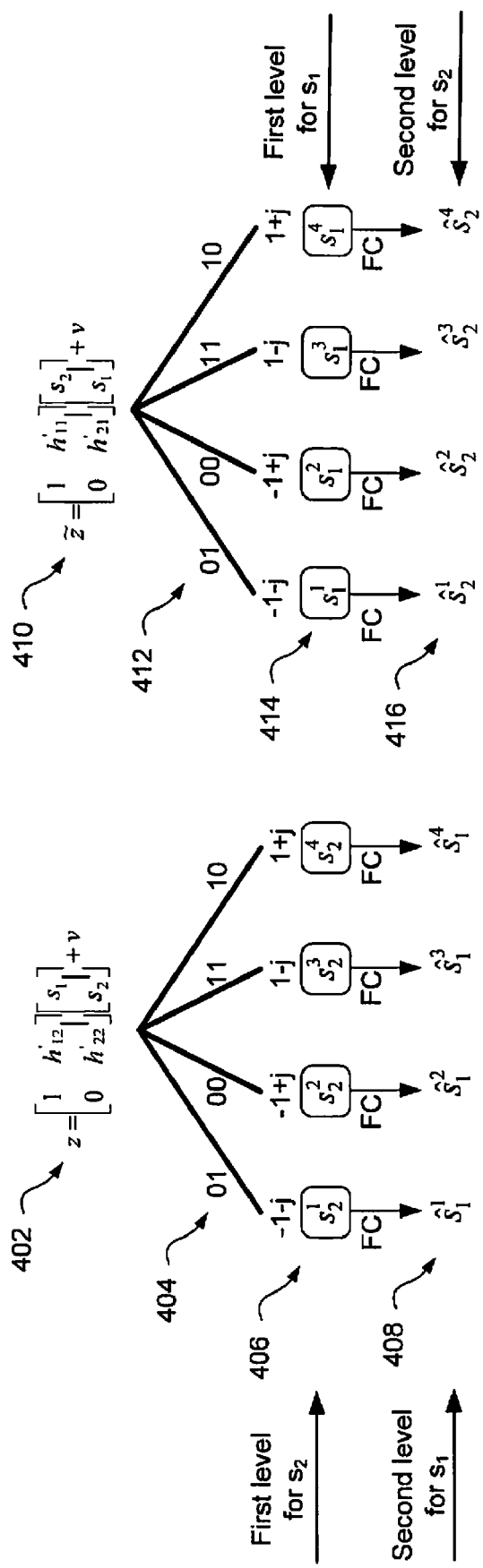
FIG. 4 shows an illustrative representation of the first child calculation process for a specific case of $2 \times N_R$ MIMO system with 4-QAM constellation.

An implementation of the method utilizing QR-decompositions is shown in reference to FIG. 3. Let $\Omega_1$ and $\Omega_2$ denote the constellation schemes of $s_1$ and $s_2$, respectively. The QR-decomposition of the channel matrix is denoted as H=QR shown at step 302, where Q is a unitary matrix of size 2×2 and R is an upper triangular 2×2 matrix (FIG. 4 shows an example in a 2×2 4-QAM system). At step 304 (or equivalently step 404 in FIG. 4), performing the following nulling operation by $Q^H$ yields:

$$z = Q^H y = Rs + v = \begin{bmatrix} r_{11} & r_{12} \\ 0 & r_{22} \end{bmatrix} \begin{bmatrix} s_1 \\ s_2 \end{bmatrix} + v, \quad (9)$$

where $r_{11}, r_{22}$ are real numbers. Since the nulling matrix $Q^H$ is unitary, the noise, $v=Q^H n$, remains spatially white. Exploiting the triangular nature of R in (9), the vector norm, $\|y-Hs\|^2$, can be expanded as.

$$\hat{s} = \text{argmin}_s \{|z_2 - r_{22}s_2|^2 + |z_1 - r_{11}s_1 - r_{12}s_2|^2\}. \quad (10)$$

The above problem can be thought of as a tree-based search problem with 2 levels (404 in FIG. 4), where the first level of the tree corresponds to the second row of the matrix in (9) while the second level of the tree is corresponding to the first row of (9). Starting from the last row, $s_2$ (called the parent symbol) is detected first and based on $s_2$ (called the child symbol) the next symbol, $s_1$, in the upper row will be detected. Thus in order to find the optimal solution, all the possible values of $s_2$ in $\Omega_2$ are considered at step 310, resulting in $|\Omega_2|$ possible candidates denoted by $\{\hat{s}_2^1, \hat{s}_2^2, \ldots, \hat{s}_2^{|\Omega_2|}\}$ (step 406 in FIG. 4.). Each of these candidates has $|\Omega_1|$ possible children. However, only the best child of each candidate is selected at step 312 (step 408 in FIG. 4.). The best child refers to the child ($s_1$) that results in the lowest Euclidean distance from the received point. Thus based on the model in (9), for a specific parent candidate $\hat{s}_2^i$, its first child is determined using the following minimization:

$$\hat{s}_1^i = \arg\min_{s_1 \in \Omega_1} |z_1 - r_{11}s_1 - r_{12}\hat{s}_2^i|^2, \quad (11)$$

for all $i \in \{1, \ldots, \Omega_2\}$. A simple zero-forcing estimation (i.e., $(z_1 - r_{12}s_2) \times 1/r_{11}$) can be employed in step 312 to prohibit the exhaustive search to find the best child.

Let $S_{ML}$ represent the set of all such pair candidates, i.e., $S_{ML} = \{[\hat{s}_1^i, \hat{s}_2^i]^T\}_{i=1}^{|\Omega_2|}$ that are added to the candidate list at step 314. At step 316 it is determined if all values of i have been evaluated, if No at step 316, step 312 is performed. Once all the values have been evaluated, Yes at step 316, the log-likelihood ratios (LLRs) of all bits are calculated for each resulting vector at step 318. The resulting LLR values are provided to the CTC decoder at step 319. These LLR values are statistically sufficient to find the optimal values of the corresponding transmitted bits of $s_2$.

The next step is to flip the columns of H (called $\tilde{H}$) at step 320. This results in the following model:

$$y = \tilde{H}\tilde{s} + n = \begin{bmatrix} h_{12} & h_{11} \\ h_{22} & h_{21} \end{bmatrix} \begin{bmatrix} s_2 \\ s_1 \end{bmatrix} + n, \quad (12)$$

where $\tilde{s} = [s_2 \ s_1]^T$. In this case $s_1$ is the parent symbol and $s_2$ is the child symbol resulting in a new tree again with two levels (412 in FIG. 4.). Taking the same approach as before, by applying the QR-decomposition on $\tilde{H}$, the nulling operation results in the following at step 322 (or equivalently step 410 in FIG. 4.).

$$\tilde{z} = \tilde{Q}^H y = \tilde{R}\tilde{s} + \tilde{v} = \begin{bmatrix} \tilde{r}_{11} & \tilde{r}_{12} \\ 0 & \tilde{r}_{22} \end{bmatrix} \begin{bmatrix} s_2 \\ s_1 \end{bmatrix} + \tilde{v}, \quad (13)$$

In (13), all the possible cases of $s_1$ in $\Omega_1$ are considered at step 324 (step 414 in FIG. 4.) and for each of them its corresponding first child is determined (416 of FIG. 4). The new resulting pairs $\{[\hat{s}_1^i, \hat{s}_2^i]^T\}_{i=1}^{|\Omega_1|}$, are added to $S_{ML}$ at step 334. At step 340 it is determined if all values of i have been evaluated, if No at step 340, step 332 is performed. Therefore, the outputs of steps 316 and 340 are a total of $|\Omega_1| + |\Omega_2|$ pairs in the set $s_{ML}$, based on which the LLR values are calculated at step 342 and the soft ML detection is performed. The resulting LLR values are provided to the CTC decoder at step 319 for further processing.

It will be shown below that the above approach results in the optimal ML detection so there is no performance loss associated to the First-Child detector compared to the ML-detector (Theorem below). Note that while the First-Child has the same performance result as that of in ML, it comes with a much lower complexity, which scales linearly with the constellation size. This is because of the fact that in the First-Child scheme, the total number of visited branches is $|\Omega_1| + |\Omega_2|$ as opposed to $|\Omega_1| \times |\Omega_2|$ branches in the ML detection scheme. The gap in the complexity widens especially for high-order constellation schemes (for example in the case of 256-QAM, the First-Child approach searches over 0.7% of the points that the ML detector explores because $2 \times 256/256^2 \cong 0.0071$, thus a significant reduction in the complexity).

In the sequel, the method for finding the first child of each candidate without visiting all the possible children is described. In (9), $\hat{s}_2^i$ is assumed to be the current parent candidate. Using the first row of (9), the zero-forcing estimate of $s_1$ can be found as $$z_1^{ZF} = (z_1 - r_{12}\hat{s}_2^i)/r_{11}. \quad (14)$$

In order to find the first child of $\hat{s}_2^i$, $z_1^{ZF}$ needs to be rounded to the nearest constellation point. This is definitely the child that minimizes the Euclidean distance between the candidate pair and the received signal. This is because of the fact that the Euclidean distance can be written $|z_2 - r_{22}s_2|^2 + |(z_1 - r_{12}s_2)/r_{11} - s_1|^2 r_{11}^2$, where the first term of this summation is independent of $s_1$ and the second term is minimized by choosing the closest point in the constellation $(z_1 - r_{12}s_2)/r_{11}$.

The proof of the optimality of the above scheme is presented in the Theorem below. The above approach can be easily extended to a general $2 \times N_R$ system. In other words, the QR-decomposition of a $N_R \times 2$ channel matrix H=QR results in a $N_R \times N_R$ unitary matrix Q and a $N_R \times 2$ upper triangular matrix R whose last $N_R - 2$ rows are all zero. Thus after the QR-decomposition, both sides of the equation (3) are multiplied by $Q^H$, and taking the first two rows of the resulting equation, the detection process is followed in the exact same way as that of in a 2×2 system.

Simplified First-Child: The above method for the soft-detection is based on the implementation of the QR-decomposition. Since each QR-decomposition requires two divisions to be implemented, its hardware realization might incur a complex hardware core. Moreover, the fixed-point implementation of the QR-decomposition depending on the underlying method reveals instability specially for ill-conditioned channels, which is because of the projections intrinsic to the QR-decomposition methods. An alternative to the QR decomposition, Simplified First-Child avoids the incurred computational complexity of the QR-decomposition while providing a framework to implement the First-Child.

The motivation is to develop a simplified version of the above scheme, which does not require the implementation of the QR-decomposition, which results in lower hardware complexity while maintaining the benefits of the above scheme in terms of the optimality of the soft detection method.

The complex baseband equivalent model, considered for a 2×2 MIMO system in (3), can be rewritten as:

$$y = Hs + n = \begin{bmatrix} h_{11} & h_{12} \\ h_{21} & h_{22} \end{bmatrix} s + n. \quad (15)$$

Let $$a = \frac{h_{11}}{\|H_1\|}, \text{ and } b = \frac{h_{21}}{\|H_1\|},$$

where $\|H_1\| = [h_{11} \ h_{21}]^T$, and $\|H_1\| = |h_{11}|^2 + |h_{21}|^2$, denoting the norm of the first column of H. Based on these definitions, a matrix D is defined as follows:

$$D = \begin{bmatrix} a^* & b^* \\ -b & a \end{bmatrix}. \quad (16)$$

In fact, matrix D is used instead of the QR-decomposition in order to triangularize the channel matrix. In other words, the application of D to H, removes the interference of one signal from the other, i.e., $$D*H = \begin{bmatrix} a^* & b^* \\ -b & a \end{bmatrix} \times \begin{bmatrix} h_{11} & h_{12} \\ h_{21} & h_{22} \end{bmatrix} = \begin{bmatrix} 1 & h'_{12} \\ 0 & h'_{22} \end{bmatrix}, \quad (17)$$

where $h'_{12}=[a^* b^*]\times H_2$, and $h'_{22}=[-b\ a]\times H_2$. Since the matrix D is unitary, because of the fact that $$D^H \times D = D \times D^H = \begin{bmatrix} |a|^2+|b|^2 & 0 \\ 0 & |a|^2+|b|^2 \end{bmatrix} = (|a|^2+|b|^2)I,$$

its application to the received signal does not incur the noise enhancement problem and preserves the optimality. This means that noise will remain spatially white. For a known channel matrix, the application of D to (15) can be written as:

$$z = D*y = D*H + D*n \quad (18)$$

$$z = \begin{bmatrix} 1 & h'_{12} \\ 0 & h'_{22} \end{bmatrix} \begin{bmatrix} s_1 \\ s_2 \end{bmatrix} + v \quad (19)$$

Comparing (19) with (9), in the last row, the interference of $s_1$ is cancelled from $s_2$, which makes it possible to detect $s_2$ independently. In fact, because of the soft nature of the detection scheme, this allows all the possibilities to be considered for $s_2$ based on which the best candidates for $s_1$ are selected. The result is a complementary list of candidates (i.e., $s_{FC}$) that provides the sufficient information to calculate the LLR values of $s_2$. Note that as opposed to the real value $r_{22}$ in (9), the parameter $h'_{22}$ in (19) is a complex number.

Figure 5:
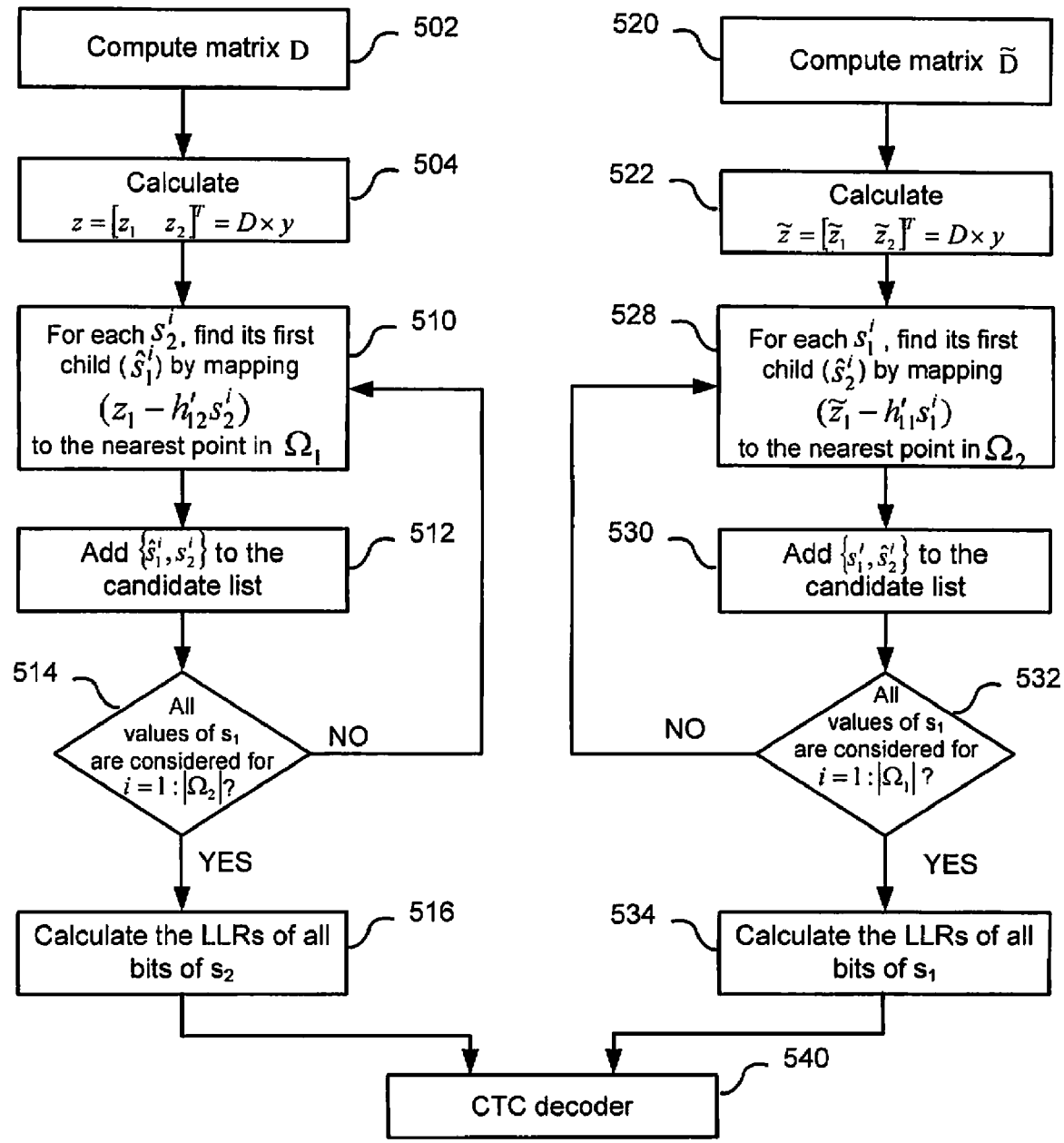
FIG. 5 shows a method of a linear-complexity optimal soft MIMO detector using a simplified First-Child method.

Since matrix D is unitary, noise whiteness and variance remain intact. This is as opposed to the common nulling operations in ZF, or MMSE, where the main goal is the interference cancellation. In other words, in these approaches the interference cancellation comes with the noise enhancement whereas in the present disclosure the interference cancellation is performed while the noise remains intact. This provides a suitable framework for the optimal soft detection. In other words, after applying the matrix D to the received matrix, $s_2$ can be detected. Since the optimal soft detection is concerned, all the possible values of $s_2$ are considered. For each of the $s_2$ values, the best candidate for $s_1$, which refers to the candidate resulting in the lowest Euclidean distance from the received signal, is determined based on the first row of (19). Using this strategy, the exhaustive search is avoided while the optimal set for LLR values for $s_2$ are calculated. The flowchart of the simplified First-Child scheme is shown in FIG. 5.

In order to calculate the LLR values of $s_1$, the same process is performed for the flipped version of the channel, i.e., $\tilde{H}$ in (12). Based on the equation (12), a new matrix $\tilde{D}$ is defined and applied to both sides of (12), resulting in:

$$\tilde{z} = \tilde{D}*y = \tilde{D}*\tilde{H} + \tilde{D}*n \quad (20)$$

$$\tilde{z} = \begin{bmatrix} 1 & h'_{12} \\ 0 & h'_{22} \end{bmatrix} \begin{bmatrix} s_1 \\ s_2 \end{bmatrix} + \tilde{v} \quad (21)$$

where $$\tilde{D} = \begin{bmatrix} c^* & d^* \\ -d & c \end{bmatrix} \quad (22)$$

$$c = \frac{h_{21}}{\|H_2\|}, \text{ and } d = \frac{h_{22}}{\|H_2\|},$$

where $\|H_2\| = [h_{12}\ h_{22}]^T$, and $\|H_2\| = |h_{12}|^2 + |h_{22}|^2$.

Thus the LLR values of the second transmitted symbol (user), $s_2$, are calculated based on (19), while the LLR values associated to the first symbol (user), $s_1$, are determined using equations (20)-(22). The derivation of (19), and (21) requires only two matrix multiplications and does not require the implementation of the projection function and square-root function.

Due to the nature of the matrix D, the first elements of D×H and $\tilde{D}\times\tilde{H}$ are always unity, which implies that the division in the normal implementation based on QR in (14) is always avoided in this scheme. This results in fewer number of divisions and a more stable fixed-point implementation.

Referring to FIG. 5, input parameters y and H are provided. The following parameters are initialized:

1) Set $s_{FC} = \{\}$ and $\tilde{s}_{FC} = \{\}$

2) $a = \frac{h_{11}}{\|H_1\|}, b = \frac{h_{21}}{\|H_1\|}, c = \frac{h_{12}}{\|H_2\|}, d = \frac{h_{22}}{\|H_2\|}.$ 3) $h'_{12} = a*h_{12} + b*h_{22}.$
$h'_{22} = -bh_{12} + ah_{22},$
$h'_{11} = c*h_{11} + d*h_{21},$
$h'_{21} = -dh_{11} + ch_{21}.$ For the processing of the first received vector $s_2$, $$D \leftarrow \begin{bmatrix} a^* & b^* \\ -b & a \end{bmatrix}$$

is computed at step 502. $z=[z_1\ z_2]^T=Dxy$ is then calculated at step 504. For $i=1:|\Omega_2|$ the first child of each $s_2^i$ is determined by mapping $(z_1-h'_{12}s_2^i)$ to its nearest $\hat{s}_1^i$ in the constellation $\Omega_1$ at step 510 and the resulting set $\{\hat{s}_1^i, s_2^i\}$ is added to $s_{FC}$ candidate list at step 512. Steps 510 and 512 are repeated if all values of $s_1$ have not been considered, No at step 514. If all values have been considered, Yes at step 514, the LLR values of $s_2$ based on $s_{FC}$ are calculated.

The second received vector $s_1$ is processed, $$\tilde{D} \leftarrow \begin{bmatrix} c^* & d^* \\ -d & c \end{bmatrix}$$

is computed at step 520. $\tilde{z}=[\tilde{z}_1\ \tilde{z}_2]^T=Dxy$ is calculated at step 522. For $i=1:|\Omega_1|$ the first child of each $s_1^i$ is determined by mapping ($\tilde{z}_1 - h'_{11}s_1^i$) to its nearest $\hat{s}_2$ in constellation $\Omega_2$ at step 528 and the resulting set $\{s_1^i \hat{s}_2^i\}$ is added to $\tilde{s}_{FC}$ candidate list at step 530. Step 528 and 530 are repeated if values of $s_2$ have not been considered, No at step 532. If all values have been considered, Yes at step 532, the LLR values of $s_1$ based on $\tilde{s}_{FC}$ are calculated. The LLRs for $s_1$ and $s_2$ are provided to the CTC decoder at step 540 for processing.

Figure 6:
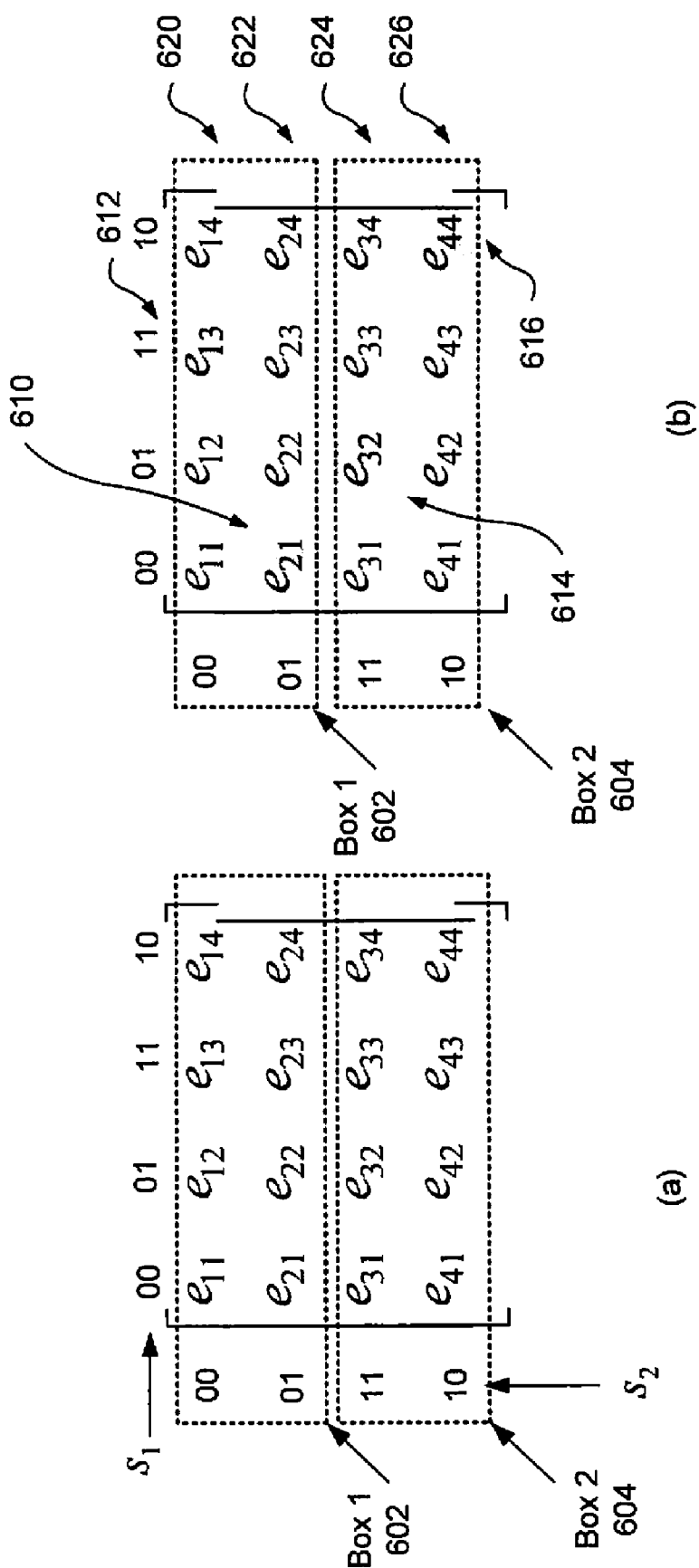
FIG. 6 shows an illustrative representation of the efficient provision of candidates for the LLR calculation without performing the exhaustive search.
Figure 7:
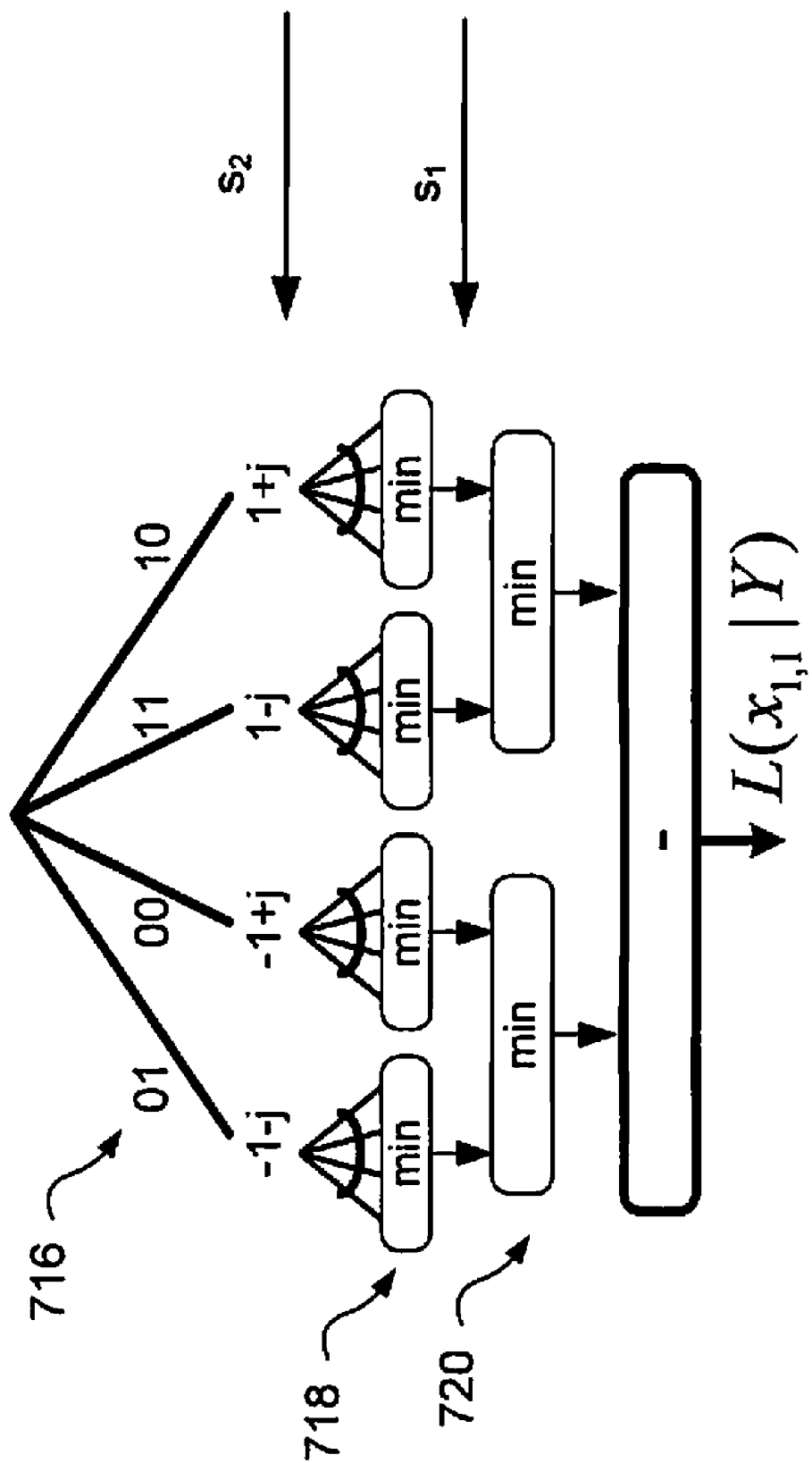
FIG. 7 shows an illustrative representation of the way the LLR values are calculated (the value of $L(x_{1,1}|y)$ as an example) based on the First-Child method; and It will be noted that throughout the appended drawings, like features are identified by like reference numerals.

The simplified First-Child method provides an efficient way to calculate the LLR values. FIG. 6 shows an example for a 2×2 4-QAM MIMO system, where the 4×4 matrix represents all the possible combinations of the transmitted symbols for $s_1$ (columns) and $s_2$ (rows). The $e_{ij}$ values represent the Euclidean distance between y and $H[s_1 \, s_2]^T$. The figure shows how the LLR value of the first bit of $s_2$ is calculated based on the candidate lists $s_{FC}$ generated by First-Child scheme, where Box 1 602 represents all the possible cases where the first bit of $s_2$ is "0", whereas Box 2 604 represents all the possible cases where the first bit of $s_2$ is "1". To calculate the LLR, it is required to calculate the minimum value of $e_{ij}$ values in each box first and then subtract them to find the LLR. This requires the calculation of all $e_{ij}$ values. The minimum values of $e_{ij}$ are directly determined in each row without calculating the other values. In fact each row corresponds to one parent candidate. Thus this local minimization is done using the First-Child method for each parent symbol. Once the local minimums are found in each row (gray circles 610, 612, 614 and 616 in (b), the minimization between the first 620 and second 622 rows gives the minimum value of Box 1 and the minimum of the third 624 row and fourth 626 row gives the minimum value of Box 2. These min values 610, 612, 614 and 616 in the rows are then used to calculate the LLR value of the first and second bit of $s_2$. This process is pictorially shown in FIG. 7 too, where the LLR of the first bit of $s_1$ ($x_{1,1}$) is calculated. In FIG. 7 the first two branches of 616 in the tree correspond to the box 602 while the two branches of 716 on the right correspond to the box 604 in FIG. 6. The first level of minimization in 618 corresponds to the first child calculation and local minimizations in each row while the second level of minimizations in 720 represent the minimum Partial Euclidean Distance (PED) in each box. The same process is performed column-wise to calculate the LLR values of $s_1$, by considering vertical boxes in this case. The amount of the saving in the computation grows exponentially with increasing constellation order. Therefore, the number of searches are reduced from $|\Omega|^2$ to $2|\Omega|$, assuming $\Omega_1 = \Omega_2 = \Omega$.

The above method can be applied to any 2×$N_R$ system. The general idea is to generate a generalized D matrix, which performs the nulling operation while avoids the noise enhancement and at the same time makes all the elements of the first column of H, except its first element, zero. For instance for $N_R = 4$, the matrix D can be written as follows:

$$D = \begin{bmatrix} r_1 & 0 & r_2 & 0 \\ 0 & r_1 & 0 & r_2 \\ -r_2 & 0 & r_1 & 0 \\ 0 & -r_2 & 0 & r_1 \end{bmatrix} \begin{bmatrix} a^* & b^* & 0 & 0 \\ -b & a & 0 & 0 \\ 0 & 0 & c^* & d^* \\ 0 & 0 & -d & c \end{bmatrix},$$

where $a = \dfrac{h_{11}}{r_1}, b = \dfrac{h_{21}}{r_1}, c = \dfrac{h_{31}}{r_2}, d = \dfrac{h_{41}}{r_2},$ $r_1 = \sqrt{|h_{11}|^2 + |h_{21}|^2}$, $r_2 = \sqrt{|h_{31}|^2 + |h_{41}|^2}$.

Note that the above defined D matrix is unitary and makes the first element of the first column of H unity, while the rest of the elements of the first column become zero. In other words:

$$H' = D * H = \begin{bmatrix} 1 & h'_{12} \\ 0 & h'_{22} \\ 0 & h'_{32} \\ 0 & h'_{42} \end{bmatrix}.$$

Based on this mathematical formulation, again all the possible values of $s_2$ are considered, where for each of them the first child is calculated based on the first row of H'. This calculation is also repeated for the flipped version of H (i.e., $\tilde{H}$) and the resulting first children are sent to the LLR calculation core to calculate the LLR values.

Theorem: The First-Child method provides the exact ML solution for a 2×$N_R$ MIMO system.

Proof: In a 2×$N_R$ MIMO, where two symbols with constellations $\Omega_1$, and $\Omega_2$ are transmitted at the same time, for instance if $s_1$ transmits with 4-QAM, $|\Omega_1|=4$, $\Omega_1=\{-1-j,-1+j,1-j,1+j\}$, let $M_{c1}=\log_2(|\Omega_1|)$, and $M_{c2}=\log_2(|\Omega_2|)$. Using the definition of the log-likelihood-ratio, the LLR value of the k-th bit of the l-th symbol is derived based on (8). Since in the WiMAX framework, l=2, for the optimum ML soft-demodulation, the LLR computation needs to be implemented by visiting all the constellation points in the two dimensional received signal space. Therefore, in order to compute the LLR values in (9) for a specific bit, the whole space needs to be explored. For instance the LLR value of the k-th bit of the second symbol, $\Lambda_2^{(k)}$, can be written as:

$$L(x_{k,2} \mid y) = \frac{1}{2\sigma^2} \min_{\chi_{k,2}^{-1}} \left\| y - H \cdot \begin{bmatrix} s_1 \\ s_2 \end{bmatrix} \right\|^2 - \frac{1}{2\sigma^2} \min_{\chi_{k,2}^{+1}} \left\| y - H \cdot \begin{bmatrix} s_1 \\ s_2 \end{bmatrix} \right\|^2 \quad (23)$$

This means that we need to calculate the metric $$\left\| y - H \cdot \begin{bmatrix} s_1 \\ s_2 \end{bmatrix} \right\|^2$$

for all cases in which the first bit of $s_2$ maps to "0", and also for the case where the first bit of $s_2$ maps to "1". Each of these cases includes $2^{M_{c2}-1} \times 2^{M_{c1}}$ points. Thus the calculation of (23) requires to explore $2^{M_{c1}-1} \times 2^{M_{c2}}$ points to be searched for the case of $X_{k,2}=+1$ and the same number of points for the case of $X_{k,2}=-1$, which comes to the total number of $2^{M_{c1}+M_{c2}}$ constellation points. Remember we need to repeat the same computation load for other bits of the two layers. Since there are $M_{c1}$ bits per first symbol and $M_{c2}$ bits per second symbol, $M_{c1} + M_{c2}$ bits in total, this results in the total computation of $(M_{c1} + M_{c2}) \times 2^{M_{c1}+M_{c2}}$ constellation points. This means that the complexity of ML is exponential with the constellation size.

We prove that the proposed approach calculates the same LLR values as that of for ML for the second symbol $s_2$. The derivation for $s_1$ will be the same. Thus we focus on the LLR calculation for $s_2$ by ML in (23). Let $$s = \begin{bmatrix} s_1 \\ s_2 \end{bmatrix},$$

since the matrix Q is unitary (i.e., $Q^H Q=1$), equation (23) can be rewritten as $$L(x_{k,2} \mid y) = \frac{1}{2\sigma^2} \min_{\chi_{k,2}^{-1}} \|z - Rs\|^2 - \frac{1}{2\sigma^2} \min_{\chi_{k,2}^{+1}} \|z - Rs\|^2. \quad (24)$$

Using the upper triangular structure of R in (9), $L(x_{k,2}|y)$ in the above expression can be further expanded to $$\frac{1}{2\sigma^2} \begin{bmatrix} \min_{\chi_{k,2}^{-1}} (|z_2 - r_{22}s_2|^2 + |z_1 - r_{11}s_1 - r_{12}s_2|^2) - \\ \hline t^{-1} \\ \min_{\chi_{k,2}^{+1}} (|z_2 - r_{22}s_2|^2 + |z_1 - r_{11}s_1 - r_{12}s_2|^2) \\ \hline t^{+1} \end{bmatrix} \quad (25)$$

Since $\chi_{k,2}^{-1} \cap \chi_{k,2}^{+1} = \phi$, the above two minimizations are performed independently, the minimization of the first term is focused on. The second term can be minimized accordingly. Let $K_k^{-1}(K_k^{+1})$ denote the set of all constellation points in $\Omega_2$ that have the k-th bit as $-1(+1)$, e.g. in the example in FIG. 4, $K_1^{+1} = \{1+j, 1-j\}$ and $K_2^{+1} = \{-1-j, 1-j\}$. Note that $|K_k^{-1}| = |K_k^{+1}| = |\Omega_2|/2$, $K_k^{-1} \cap K_k^{+1} = \phi$, and $K_k^{-1} \cup K_k^{+1} = \Omega_2$. Therefore, in order to minimize over $\chi_{k,2}^{-1}$, $|\Omega_2|/2$ symbols are considered. For each of these symbols, there are $|\Omega_1|$ candidates associated with $s_1$. The ML approach explores all the possible $|\Omega_2||\Omega_1|2$ candidates and find the one with the lowest PED. In our proposed approach, however, for each $s_2$ in $K_k^{-1}$, the value of $s_1$ that results in the lowest local PED is determined first. The globally lowest PED is in fact the one with the lowest PED among these local minimums. Thus our approach is equivalent to calculating the global minimum by finding the one with the lowest PED among the local minimums. This is pictorially shown in FIG. 7 for calculation of the LLR value of the first bit of the first level, i.e., $L(x_{1,1}|y)$. Therefore, the present approach is to choose one value for $s_2$ in $K_k^{-1}$, and find the local minimum associate to the chosen $s_2$, i.e., $$\operatorname{argmin}_{s_1 \in \Omega_1} (|z_2 - r_{22}s_2|^2 + |z_1 - r_{11}s_1 - r_{12}s_2|^2) \quad (26)$$

$$= \operatorname{argmin}_{s_1 \in \Omega_1} (|z_1 - r_{11}s_1 - r_{12}s_2|^2) \; \forall \, s_2 \in K_k^{-1}, \quad (27)$$

where (27) is based on the fact that the first term in (26) is in common between all $s_1 \in \Omega_1$. As mentioned earlier, the minimization in (27) is equivalent to considering $|\Omega_1|$ candidates for $s_1$ and find the one with the lowest PED. In fact using the Schnorr-Euchner method, the candidate with the lowest PED can be easily found without exploring all the possible candidates. This is performed by mapping $s_1$ to the nearest candidate based on the first order estimation as follows.

Since $r_{11}$ is a real number, the problem in (27) can be rewritten as $$\operatorname{argmin}_{s_1 \in \Omega_1} [|R(z_1/r_{11}) - R(r_{12}/r_{11}s_2) - R(s_1)|^2 + |\Im(z_1/r_{11}) - \Im(r_{12}/r_{11}s_2) - \Im(s_1)|^2] \quad (28)$$

where $R(\cdot)$, and $\Im(\cdot)$ denote the real part and the imaginary part of a complex number, respectively. The above minimization problem can be easily solved by mapping the $R(s_1)$, and $\Im(s_1)$ to the nearest constellation point based on $R(z_1/r_{11}) - R(r_{12}/r_{11}s_2)$, and $\Im(z_1/r_{11}) - \Im(r_{12}/r_{11}s_2)$, respectively. Thus for each $s_2 \in_k^{-1}$, this method determines the value of $s_1$ that minimizes (27) with one single search rather than $|\Omega_1|$ searches, which is translated to a significant reduction both in the algorithmic and hardware level complexity. In brief, in order to find $I^{-1}$ in (25), $|\Omega_2|/2$ minimizations corresponding to the elements in $K_k^{-1}$ are performed. In the same way, $|\Omega_2|/2$ minimizations corresponding to the elements in $K_k^{+1}$ are performed to find $I^{+1}$. Thus with $|\Omega_2|$ searches, all nodes required to calculate the $L(x_{k,2}|y)$ value are determined. Note that these calculated nodes are sufficient to calculate the LLR values of all the bits of $s_2$. This is because of the fact that for any arbitrary value $k \in \{(1, 2, \ldots, M_{c2}\}$, $|K_k^{-1}| = |K_k^{+1}| = |\Omega_2|/2$, $K_k^{-1} \cap K_k^{+1} = \phi$, and $K_k^{-1} \cup K_k^{+1} = \Omega_2$. Therefore, using our proposed approach all the LLR values of $s_2$ are calculated, which results in the exact same values from the ML method. Using the same reasoning, it is easy to show that the LLR values of $s_1$ are also the same as the ones from the ML detector. Thus, all the LLR values of two symbols are determined with only $|\Omega_1| + |\Omega_2|$ searches rather than $|\Omega_1| \times |\Omega_2|$ in the ML detector.

The MIMO receiver algorithm provides the exact optimal ML solution and avoids the exhaustive search. The computational complexity grows linearly with the constellation order and therefore, it is easily scalable to high-order constellation schemes such as 64-QAM and 256-QAM. The log-likelihood ratios are calculated efficiently by providing the minimum possible visited nodes theoretically required for the LLR calculation. It has fixed-throughput independent of the SNR and the channel condition. Since two transmitted symbols (users) are detected independently, and the LLR values of all bits of a symbol (user) are calculated in parallel, the present disclosure is suitable for pipelined and parallel hardware VLSI implementations. It implements the detection of two users in collaborative-MIMO scheme (in WiMAX profile) independently. The intrinsic parallelism results in a low latency hardware architecture and has fixed critical path length independent of the constellation order. The method is applicable to any $2 \times N_R$ Matrix-B MIMO architecture including downlink Matrix-B detection in IEEE 802.16e and the collaborative MIMO (C-MIMO) framework envisioned in the uplink IEEE 802.16e. It can also be implemented jointly with beam-forming techniques. It exploits the full diversity intrinsic to the C-MIMO scheme and it can easily accommodate two users with different constellation schemes (e.g. 4-QAM and 64-QAM). The detection complexity of each user is independent of the constellation order of the other user. The method is square-root free, which simplifies the hardware implementation. An interference cancellation method is applied while projection is avoided. It does not require any performance enhancing signal processing cores such as the channel pre-processing and/or lattice reduction before the detection core, which results in a lower complexity at the receiver.

It will be apparent to persons skilled in the art that a number of variations and modifications can be made without departing from the scope of the present disclosure as defined in the claims. The method steps may be embodied in sets of executable machine code stored in a variety of formats such as object code or source code. Such code is described generically herein as programming code, or a computer program for simplification. Clearly, the executable machine code or portions of the code may be integrated with the code of other programs, implemented as subroutines, plug-ins, add-ons, software agents, by external program calls, in firmware or by other techniques as known in the art.

The embodiments may be executed by a computer processor or similar device programmed in the manner of method steps, or may be executed by an electronic system which is provided with means for executing these steps. Similarly, an electronic memory medium such computer diskettes, Digital Versatile Disc (DVD), Compact Disc (CD), Random Access Memory (RAM), Read Only Memory (ROM) or similar computer software storage media known in the art, may be programmed to execute such method steps. As well, electronic signals representing these method steps may also be transmitted via a communication network.

The embodiments described above are intended to be illustrative only. The scope of the present disclosure is therefore intended to be limited solely by the scope of the appended claims.

The invention claimed is:

1. A method of performing a linear-complexity optimal soft Multiple-input-multiple-output (MIMO) detector in a $2 \times N_R$ system, the method comprising the steps of:
   calculating first and second generator matrices using channel pre-processing based upon a channel matrix;
   applying the generator matrices to a received vector to generate a first and a second modified received vectors wherein the first modified received vector comprises an original transmitted vector and the second modified received vector comprises a flipped version of the original transmitted vector;
   selecting a first element and a second element of the transmitted vector as child and parent symbols respectively;
   determining, for both the transmitted vector and the flipped version of the transmitted vector, for each possible value of the parent symbol, a first child by mapping a zero-forcing estimate of the child symbol to the nearest constellation point in an associated constellation scheme using the first and second modified received vectors;
   adding candidates to a candidate list from the determined parent symbol and it's first child symbol for each of the transmitted vector and flipped version of transmitted vector; and
   calculating log-likelihood ratios (LLRs) of all bits for each resulting vector.

2. The method of claim 1 wherein the first element and second element of the transmitted vector are from different constellation schemes chosen from a symmetric two-dimensional modulation scheme including a quadrature amplitude modulation (QAM).

3. The method of claim 1 wherein the channel pre-processing is implemented by performing a QR-decomposition of the channel matrix, denoted as H=QR, to remove interference between the transmitted symbols, the first generator matrix is Q and second genitor matrix is $\tilde{Q}$ are a square unitary matrix of size $N_R \times N_R$ and a modified channel matrix is R having an upper triangular $N_R \times 2$ matrix whose last $N_R-2$ rows are zero.

4. The method of claim 1 wherein the channel pre-processing is implemented by generating a unitary matrix D as the generator matrix in order to triangularize the channel matrix wherein multiplication of the channel matrix by the matrix D results a modified channel matrix, wherein the D matrix is a 2×2 matrix for a 2×2 MIMO system derived from a normalized first column of a channel matrix where its first element is a transpose of a first element in the column, it's second element is a negative of a second element in the column, it's third element is a transpose of the second element in the column and it's fourth element is the first element in the column.

5. The method of claim 1 wherein the LLR values of the bits of the second transmitted symbol is calculated based on a Euclidean distances of the candidates in the candidate list of the transmitted vector and the LLR values of the bits of the first transmitted symbol is calculated based on the Euclidean distances of the candidates in the candidate list of the flipped transmitted vector.

6. The method of claim 3 wherein the LLR values of the bits of the second transmitted symbol is calculated based on a Euclidean distances of the candidates in the candidate list of the transmitted vector and the LLR values of the bits of the first transmitted symbol is calculated based on the Euclidean distances of the candidates in the candidate list of the flipped transmitted vector.

7. The method of claim 4 wherein the LLR values of the bits of the second transmitted symbol is calculated based on a Euclidean distances of the candidates in the candidate list of the transmitted vector and the LLR values of the bits of the first transmitted symbol is calculated based on the Euclidean distances of the candidates in the candidate list of the flipped transmitted vector.

8. The method of claim 1 further comprising the step of providing calculated LLR values to a Convolutional Turbo Code (CTC) decoder for decoding.

9. The method of claim 3 further comprising the step of providing calculated LLR values to a Convolutional Turbo Code (CTC) decoder for decoding.

10. The method of claim 4 further comprising the step of providing calculated LLR values to a Convolutional Turbo Code (CTC) decoder for decoding.

11. A method of performing a linear-complexity optimal soft Multiple-input-multiple-output (MIMO) detection for a $2 \times N_R$ system, the method comprising the steps of:
    calculating a first generator matrix using channel pre-processing based upon a channel matrix;
    applying the first generator matrix to a received vector to generate a first modified received vector;
    selecting, for a transmitted vector, a first element as a child symbol and a second element as a parent symbol;
    determining, for the transmitted vector, for each possible value of the parent symbol, a first child by mapping a zero-forcing estimate of the child symbol to a nearest constellation point in an associated constellation scheme using the first modified received vector and the channel matrix;
    adding, for the transmitted vector, candidates to a candidate list of transmitted vectors from the determined parent symbol and its child symbol;
    calculating log-likelihood ratios (LLRs) of all bits for the parent symbol of the transmitted vector;
    calculating a second generator matrix using the channel pre-processing based upon the swapped version of the channel matrix; wherein the swapped version of the channel matrix derived by swapping the columns of the channel matrix;
    applying the second generator matrix to the received vector to generate the second modified received vector;
    selecting, for the flipped transmitted vector, a first element as a child symbol and the second element as a parent symbol; the flipped transmitted vector is derived by flipping the rows of the transmitted vector;
    determining, for the flipped transmitted vector, for each possible value of the parent symbol, a first child by mapping a zero-forcing estimate of the child symbol to a nearest constellation point in an associated constellation scheme using the second modified received vector and the channel matrix;
    adding, for the flipped transmitted vector, candidates to the candidate list of the flipped transmitted vectors from the determined parent symbol and its first child symbol; and
    calculating log-likelihood ratios (LLRs) of all bits for the parent symbol of the flipped transmit vector.

12. The method of claim 11 wherein the first element and second element of the transmitted vector are from different constellation schemes chosen from a symmetric two-dimensional modulation scheme including a quadrature amplitude modulation (QAM).

13. The method of claim 11 wherein the channel pre-processing is implemented by performing a QR-decomposition of the channel matrix, denoted as H=QR, to remove interference between the transmitted symbols, the first generator matrix is Q and second genitor matrix is $\tilde{Q}$ are a square unitary matrix of size $N_R \times N_R$ and a modified channel matrix is R having an upper triangular $N_R \times 2$ matrix whose last $N_R-2$ rows are zero.

14. The method of claim 11 wherein the channel pre-processing is implemented by generating a unitary matrix D, as the generator matrix, in order to triangularize the channel matrix wherein multiplication of the channel matrix by the matrix D results a modified channel matrix, wherein the D matrix is a 2×2 matrix for a 2×2 MIMO system derived from a normalized first column of a channel matrix where it's first element is a transpose of a first element in the column, it's second element is a negative of a second element in the column, it's third element is a transpose of the second element in the column and it's fourth element is the first element in the column.

15. The method of claim 11 wherein the LLR values of the bits of the second transmitted symbol is calculated based on a Euclidean distances of the candidates in the candidate list of the transmitted vector and the LLR values of the bits of the first transmitted symbol is calculated based on the Euclidean distances of the candidates in the candidate list of the flipped transmitted vector.

16. The method of claim 13 wherein the LLR values of the bits of the second transmitted symbol is calculated based on a Euclidean distances of the candidates in the candidate list of the transmitted vector and the LLR values of the bits of the first transmitted symbol is calculated based on the Euclidean distances of the candidates in the candidate list of the flipped transmitted vector.

17. The method of claim 14 wherein the LLR values of the bits of the second transmitted symbol is calculated based on a Euclidean distances of the candidates in the candidate list of the transmitted vector and the LLR values of the bits of the first transmitted symbol is calculated based on the Euclidean distances of the candidates in the candidate list of the flipped transmitted vector.

18. The method of claim 11 further comprising the step of providing calculated LLR values to a Convolutional Turbo Code (CTC) decoder for decoding.

19. The method of claim 13 further comprising the step of providing calculated LLR values to a Convolutional Turbo Code (CTC) decoder for decoding.

20. The method of claim 14 further comprising the step of providing calculated LLR values to a Convolutional Turbo Code (CTC) decoder for decoding.

* * * * *